(12) United States Patent
Takahashi et al.

(10) Patent No.: US 8,505,894 B2
(45) Date of Patent: Aug. 13, 2013

(54) MACHINE TOOL

(75) Inventors: Muneo Takahashi, Kanagawa (JP);
Toshiyuki Kusakari, Kanagawa (JP)

(73) Assignee: Makino Milling Machine Co., Ltd. (JP)

( * ) Notice: Subject to any disclaimer, the term of this patent is extended or adjusted under 35 U.S.C. 154(b) by 591 days.

(21) Appl. No.: 12/526,066

(22) PCT Filed: Feb. 13, 2008

(86) PCT No.: PCT/JP2008/052786
§ 371 (c)(1),
(2), (4) Date: Aug. 6, 2009

(87) PCT Pub. No.: WO2008/099956
PCT Pub. Date: Aug. 21, 2008

(65) Prior Publication Data
US 2010/0320668 A1    Dec. 23, 2010

(30) Foreign Application Priority Data
Feb. 16, 2007   (JP) ................. 2007-036451

(51) Int. Cl.
*B23Q 1/25* (2006.01)
*B23Q 7/00* (2006.01)
*B23Q 17/00* (2006.01)
*B23Q 39/04* (2006.01)
*B23Q 41/02* (2006.01)
*B25B 1/22* (2006.01)
*B25B 7/12* (2006.01)

(52) U.S. Cl.
USPC ................. 269/55; 269/71; 29/33 P; 29/563

(58) Field of Classification Search
USPC ................. 269/55, 33 P, 563, 48.5 R, 38 R, 269/722, 572; 414/426, 751
See application file for complete search history.

(56) References Cited

U.S. PATENT DOCUMENTS

| | | | | |
|---|---|---|---|---|
| 3,822,959 | A | * | 7/1974 | Tabard ........................... 408/89 |
| 3,882,991 | A | * | 5/1975 | Chayka et al. ............. 198/464.1 |
| 4,130,920 | A | * | 12/1978 | Siarto ........................... 29/38 R |
| 4,209,910 | A | * | 7/1980 | Rathsack et al. ................ 33/572 |
| 4,243,083 | A | * | 1/1981 | Serrano ........................ 144/35.2 |
| 4,253,559 | A | * | 3/1981 | Myers et al. ............... 198/345.3 |
| 4,520,700 | A | * | 6/1985 | Herzog et al. .................. 82/148 |
| 4,533,034 | A | * | 8/1985 | Gregg ........................ 198/465.1 |
| 4,557,663 | A | * | 12/1985 | Csakvary et al. .......... 414/751.1 |
| 4,648,933 | A | * | 3/1987 | Graziano ...................... 156/361 |
| 4,890,371 | A | * | 1/1990 | Camloh et al. ................. 29/33 P |
| 4,909,142 | A | * | 3/1990 | Bubley .......................... 101/115 |
| 5,099,981 | A | * | 3/1992 | Guzzoni .................... 198/346.1 |

(Continued)

FOREIGN PATENT DOCUMENTS

| | | |
|---|---|---|
| JP | 02-106244 A | 4/1990 |
| JP | 9-155677 A | 6/1997 |
| JP | 2003-080433 A | 3/2003 |

*Primary Examiner* — Lee D Wilson
*Assistant Examiner* — Alvin Grant
(74) *Attorney, Agent, or Firm* — Paul and Paul (57) ABSTRACT

A machine tool (11) according to the present invention includes a table (49) having a pallet mount on which a pallet for a workpiece to be mounted thereon is mounted, a pallet station (17) provided on the side of the machine tool and having a pallet rest for a pallet to be placed thereon, and a pallet carrying device (19) arranged between the table (49) and a column (23). The pallet is carried between the table (49) and the pallet station (17).

5 Claims, 5 Drawing Sheets

(56) References Cited

U.S. PATENT DOCUMENTS

| | | | | |
|---|---|---|---|---|
| 5,172,464 | A * | 12/1992 | Kitamura et al. | 29/563 |
| 5,236,292 | A * | 8/1993 | Loucks, Jr. | 409/218 |
| 5,341,717 | A * | 8/1994 | Feldman | 86/32 |
| 5,509,191 | A * | 4/1996 | Best | 29/722 |
| 5,768,768 | A * | 6/1998 | Best | 29/792 |
| 5,996,329 | A * | 12/1999 | Cardenas | 29/48.5 R |
| 6,298,572 | B1 * | 10/2001 | McAuley | 33/573 |
| 6,305,678 | B1 * | 10/2001 | Hammersmith et al. | 269/71 |
| 6,447,224 | B2 * | 9/2002 | Mitsuzono et al. | 409/201 |
| 6,554,600 | B1 * | 4/2003 | Hofmann et al. | 425/174.4 |
| 6,785,942 | B2 * | 9/2004 | Koike | 29/33 P |
| 6,918,733 | B2 * | 7/2005 | Neuber et al. | 414/426 |
| 6,948,894 | B2 * | 9/2005 | Taga et al. | 409/235 |
| 7,356,895 | B2 * | 4/2008 | Ota | 29/27 C |
| 7,357,769 | B2 * | 4/2008 | Takayama et al. | 483/41 |
| 7,470,328 | B1 * | 12/2008 | Archer, Jr. | 118/500 |
| 7,621,031 | B2 * | 11/2009 | Kawai et al. | 29/33 P |
| 7,845,257 | B2 * | 12/2010 | Kim et al. | 82/118 |
| 2009/0112508 | A1 * | 4/2009 | Mikoleizig | 702/155 |
| 2009/0116915 | A1 * | 5/2009 | Kawasumi et al. | 408/146 |

* cited by examiner

MACHINE TOOL

TECHNICAL FIELD

The present invention relates to a machine tool having a pallet carrying device for changing a pallet.

BACKGROUND ART

In machining performed by a machine tool, a pallet carrying device is generally used with the machine tool to place a pallet having a workpiece mounted thereon on the table of the machine tool or to remove a pallet having a machined workpiece mounted thereon from the table, thereby saving labor and improving efficiency of the operation. Such a pallet carrying device is required to be arranged adjacent to a machining area of the machine tool. On the other hand, an operation area for performing various operations including monitoring machining of a workpiece by the machine tool and removing chips is required to be adjacent to the machining area of the machine tool.

However, of all the sides surrounding the machining area, the two sides, i.e., the left and right sides are sometimes occupied by obstacles in addition to a column side. For example, a vertical machine tool having a rotational axis of a spindle extending vertically (i.e., in a Z-axis direction) sometimes uses what is called a trunnion table capable of turning a pallet about a turning axis extending horizontally in lateral direction (i.e., in an X-axis direction) in order to make sophisticated machining possible. In such a case, in order to support a pallet mount on a table so as to be able to turn about a turning axis, a pair of support posts provided so as to be opposed to each other in the X-axis direction, and therefore the left and right sides of the machining area of the machine tool are occupied by the support posts, i.e., obstacles. Therefore, both the machining area and a pallet changer have to be arranged on the front side (front surface) free of obstacles, with the result that the pallet carrying device is arranged between the operation area and the machining area. As a result, the pallet carrying device inconveniently becomes an obstacle to the operation, such as monitoring and chip removal.

In order to solve the above problem, Japanese Unexamined Patent Publication Nos. 9-155677 and 2003-80433 propose a pallet carrying device in which a pallet loader for carrying a pallet is adapted to be movable and an operation area can be secured by retreating the pallet loader from a pallet change position in front of the machining area (on the opposite side of a table from a column) after completely changing the pallet.

However, both of the pallet carrying devices disclosed in Japanese Unexamined Patent Publication Nos. 9-155677 and 2003-80433 pose a problem that the pallet on the table is pulled out into the operation area in front of the machining area, and therefore an operator cannot enter the operation area during the pallet changing operation. Further, both of the pallet carrying devices disclosed in Japanese Unexamined Patent Publication Nos. 9-155677 and 2003-80433 pose a problem that the pallet loader moves in the operation area, and therefore safety of the operator is reduced.

DISCLOSURE OF THE INVENTION

Accordingly, it is an object of the present invention to make it possible to secure an operation area for monitoring of a machining process of a machine tool, a chip removal and other purposes in front of the machining area of the machine tool, without being obstructed by a pallet carrying device.

According to the present invention, there is provided a machine tool for machining a workpiece by moving a tool and the workpiece relative to each other, which includes a table provided on the machine tool and having a pallet mount on which a pallet for the workpiece to be mounted thereon is mounted, a pallet station provided on the side of the machine tool and having a pallet rest for a pallet to be placed thereon, and a pallet carrying device having arranged between a column and the table of the machine tool a carrying arm for holding a pallet and being moved in a horizontal direction to carry the pallet between the table and the pallet station.

According to this configuration, the carrying arm of the pallet carrying device can move through a space between the table and the column thereby to carry the pallet between the table and the pallet station.

The machine tool may further include a first turning unit turning the table about a horizontal axis and a second turning unit turning the table about a vertical axis. The table may be configured to have a lifter moving up and down the pallet. Alternatively, the pallet station may be configured to have a pallet lifting device moving up and down the pallet.

The pallet carrying device may be configured to have a carrying arm lifting device moving up and down the carrying arm when the carrying arm is at a position where the pallet is transferred between the carrying arm and the table and at a position where the pallet is transferred between the carrying arm and the pallet station.

As described above, according to the present invention, the pallet carrying device is arranged between the table and the column, and therefore the front side of the machining area is not occupied by the pallet carrying device. As a result, an operation area for monitoring of machining and removal of chips can be secured on the front of the machining area, thereby facilitating these operations and improving the safety of the operation.

BRIEF DESCRIPTION OF THE DRAWINGS

The above and other objects, features and advantages of the present invention will be described in more detail below based on embodiments thereof with reference to the accompanying drawings, in which.

BEST MODE FOR CARRYING OUT THE INVENTION

Figure 1:
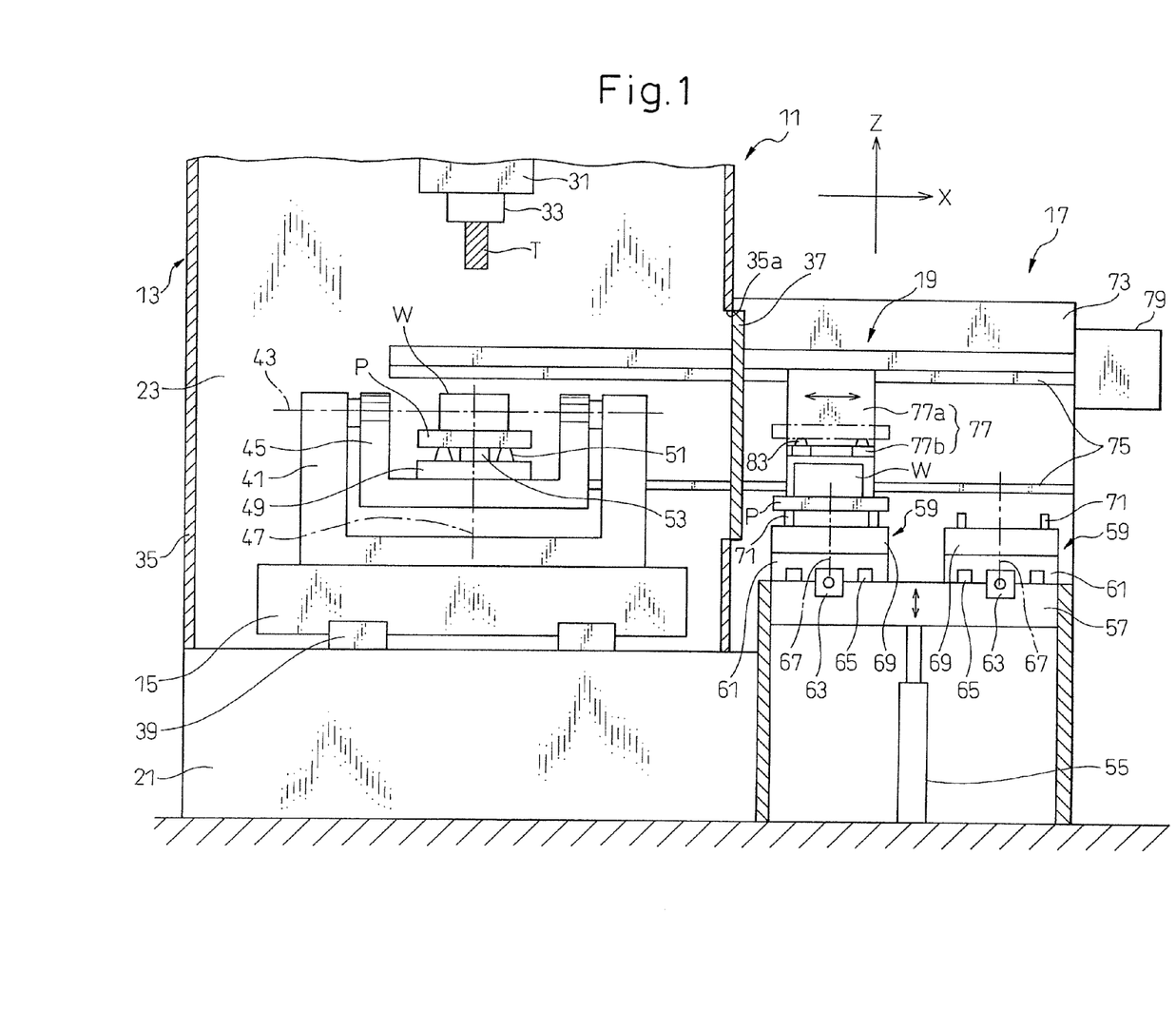
FIG. 1 is a diagram showing the general configuration of a machine tool according to a first embodiment of the present invention.
Figure 2:
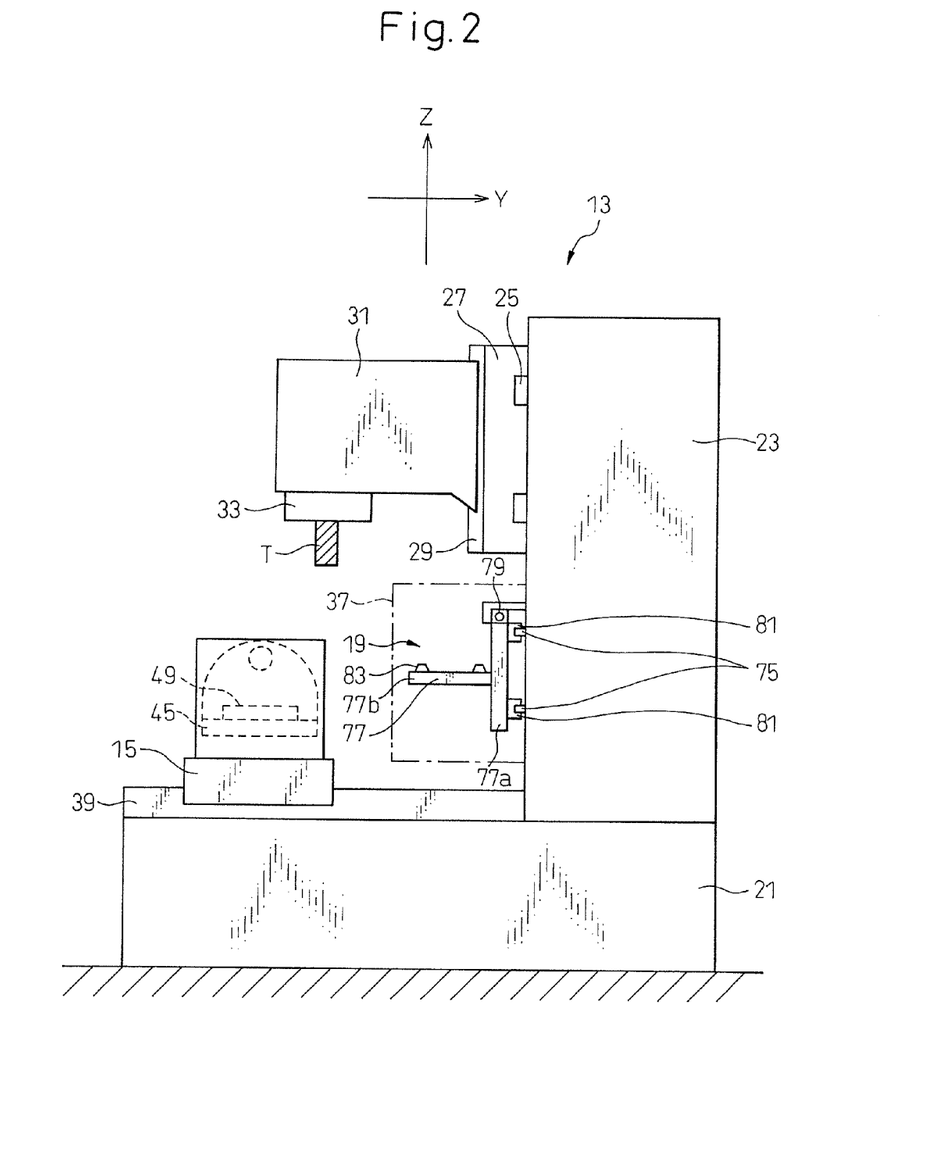
FIG. 2 is a side view of a machine tool main unit side of the machine tool shown in FIG. 1.

A machine tool according to a first preferred embodiment of the present invention will be described below with reference to the accompanying drawings. Referring to FIGS. 1 and 2, a machine tool 11 includes a machine tool main unit 13, a table 49 opposed to a column 23, a pallet station 17 arranged at a pallet standby position where a setup work for a pallet P and a workpiece W is performed, and a pallet carrying device 19 for carrying pallet P having the workpiece mounted thereon between table 49 and pallet station 17.

Machine tool main unit 13 is, for example, a vertical machining center and, as shown in FIG. 2, includes a bed 21, a column 23 erected on bed 21, a headstock 27 adapted to be movable in an X-axis direction (a left-right direction in FIG. 1 or in a direction perpendicular to the paper in FIG. 2) along guide rails 25 provided on column 23, a spindle head 31 adapted to be movable in a Z-axis direction (a vertical direction in FIGS. 1 and 2) along guide rails 29 provided on headstock 27, and a spindle 33 rotatably supported on spindle head 31 and adapted to mount a tool T thereon. Also, of all the four sides surrounding the machining area of machine tool main unit 13, the three sides other than the side on which column 23 is erected are surrounded by a splash guard 35 to prevent chips and working fluid from being scattered. Note that the wall surface of splash guard 35 screening pallet station 17 from the machining area is formed with an opening 35a adapted to be able to be opened/closed by a shutter 37 in order to allow the passage of pallet carrying device 19.

A saddle 15 is configured to be movable in a Y-axis direction (a direction perpendicular to the paper in FIG. 1 or a left-right direction in FIG. 2) along guide rails 39 provided on bed 21. On saddle 15, a table turning rest 45 is supported through a trunnion base 41 constituting a first turning unit so as to be turnable about a turning axis 43 (i.e., an A-axis direction) extending in the X-axis direction. Further, a table 49 is mounted on table turning rest 45 so as to be rotatable about a rotation axis 47 (i.e., a C-axis direction) constituting a second turning unit and extending in a Z-axis direction. Table 49 is provided on a pallet mount thereof with a taper cone 51 and a clamp unit (not shown), so that pallet P can be positioned by engaging taper cone 51 with a taper hole formed on a bottom surface of pallet P and then clamped on table 49 by a clamp unit. Further, a lifter 53 adapted to move up and down is provided on table 49, so that pallet P placed on table 49 can be moved up and down. By using this configuration, pallet P and workpiece W mounted on table 49 can be turned in the A-axis direction and rotated in the C-axis direction, while at the same time being moved up and down in the vertical direction (Z-axis direction), thereby making sophisticated machining possible.

Figure 3:
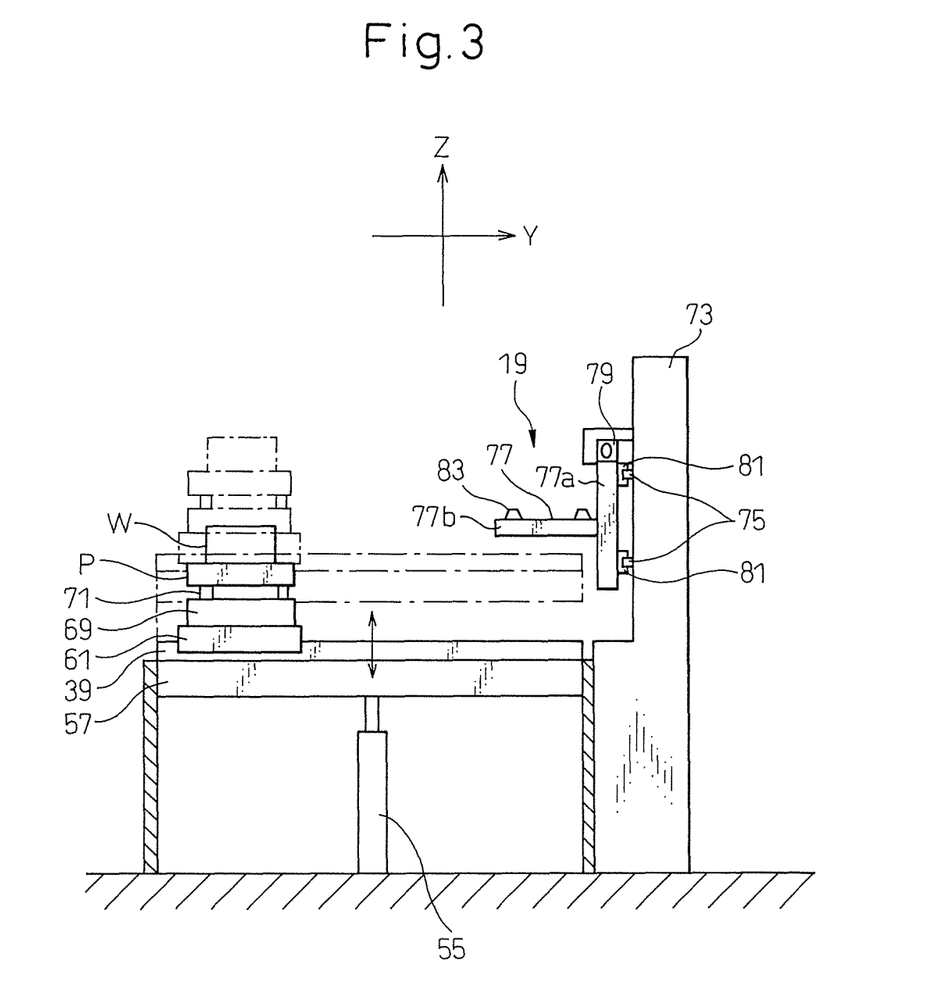
FIG. 3 is a side view of a pallet station side of the machine tool shown in FIG. 1.

As shown in FIG. 3, pallet station 17 is provided with a lift 57 configured to be able to moved up and down by a hydraulic cylinder 55, and two pallet stockers 59 are provided on lift 57. A moving base 61 is provided on each of pallet stockers 59. Each moving base 61 is configured to be driven by a pneumatic cylinder 63 to so as to move in the Y-axis direction (the direction perpendicular to the paper in FIG. 1) along guide rails 65 provided on lift 57. A pallet rest 69 is provided on each moving base 61 so as be turnable about a turning axis 67 extending in the Z-axis direction, so that a pallet P can be placed on each of pallet rests 69 through support pins 71. Hydraulic cylinder 55 constituting a pallet lifting device may be arranged on each pallet rest 69 to move the pallet up and down directly.

Pallet conveyor 19 is configured by guide rails 75 extending in the X-axis direction (the left-right direction in FIG. 1) across a front surface (the surface on the side of saddle 15) of column 23 and a front surface of a stocker frame 73 provided beside column 23, a carrying arm 77 moved along guide rails 75, and a drive unit 79 for driving carrying arm 77. Carrying arm 77 includes a plate-shaped body portion 77a having mounted thereon linear guides 81 engaging guide rails 75, and a arm portion 77b having a two-pronged fork shape and extending horizontally in the Y-axis direction. Carrying arm 77 is provided on arm portion 77b thereof with taper cones 83 adapted to engage the taper holes formed on the bottom surface of pallet P. Note that although a combination of a ball screw mechanism and a motor for rotating the ball screw is used as drive unit 79 in the embodiment shown in FIG. 1, other types of mechanism such as a chain drive mechanism described later may be used.

Next, a procedure for changing the pallet by using pallet carrying device 19 of machine tool 11 shown in FIGS. 1 to 3 will be described below.

While machine tool main unit 13 is machining a workpiece W mounted on the pallet P clamped on table 49, a pallet P having another setup workpiece W mounted thereon is placed on pallet rest at one of two pallet stockers 59 of pallet station 17. At this time, lift 57 of pallet station 17 has been moved to a lower position so as to facilitate the setup operation without hampering the movement of pallet carrying device 19, and moving base 61 has been moved to a first stocker position (a left position in FIG. 3) far from stocker frame 73. Further, during machining, carrying arm 77 of pallet carrying device 19 is retreated toward pallet station 17 so as not to hamper the machining process.

After machining of the workpiece mounted on pallet P clamped on table 49 has been completed, saddle 15 is moved to the first saddle position far from column 23 along guide rails 39. At this time, table turning rest 45 on saddle 15 is returned to an initial position in the A-axis direction (the position where pallet P on table 49 on table turning rest 45 becomes horizontal), and table 49 on table turning rest 45 is also returned to an initial position in the C-axis direction. Next, shutter 37 provided on the wall surface of splash guard 35 screening pallet station 17 from the machining area of machine tool main unit 13 is opened thereby to make the opening 35a in unclosed state. At the same time, pallet P on table 49 is moved up in unclamped state by lifter 53, so that taper cones 51 of table 49 and taper holes of pallet P are disengaged from each other.

Next, carrying arm 77 is driven by drive unit 79 to move in the X-axis direction along guide rails 75 from pallet station 17 to the pallet change position in the machining area. After carrying arm 77 is moved to the position where the carrying arm is opposed to table 49, saddle 15 is moved in the Y-axis direction along guide rails 39 to the second saddle position. Once saddle 15 is moved to the second saddle position, arm portion 77b of carrying arm 77 of pallet carrying device 19 is inserted in the gap generated between pallet P and table 49 by using lifter 53 to move up pallet P arranged on table 49. Next, by moving down lifter 53 on table 49, pallet P gets into a state where it rests on arm portion 77b of carrying arm 77. At this time, taper cones 83 provided on arm portion 77b of carrying arm 77 come to engage the taper holes of pallet P, so that pallet P is arranged in position on arm portion 77b of carrying arm 77.

Once pallet P is placed on carrying arm 77, saddle 15 is moved in the Y-axis direction along guide rails 39 to the first saddle position far from column 23. This prevents trunnion base 41 on saddle 15 or table turning rest 45, etc., from interfering with carrying arm 77 during movement of carrying arm 77. After that, carrying arm 77 of pallet carrying device 19 is moved in the X-axis direction along guide rails 75 from the machining area to pallet station 17. At this time, carrying arm 77 is stopped at the position opposed to pallet stocker (the pallet stocker on the right side in FIG. 1) 59, having no pallet P is placed thereon, of two pallet stockers 59 in pallet station 17. Next, moving base 61 of that pallet stocker 59 is driven by pneumatic cylinder 63 to move along guide rails 65 from the first stocker position far from stocker frame 73 to the second stocker position near stocker frame 73, and lift 57 is then moved up by hydraulic cylinder 55. This makes pallet P on carrying arm 77 come to be supported by support pins 71 of pallet rest 69 on moving base 61. Next, moving base 61 is moved in the Y-axis direction from the second stocker position to the first stocker position to move pallet P to the position far from conveyor arm 77, and lift 57 is then moved down by hydraulic cylinder 55. As a result, moving base 61 and pallet rest 69 are prevented from interfering with carrying arm 77 even if carrying arm 77 is moved.

Next, carrying arm 77 is moved to the position opposed to the other pallet stocker 59 by drive unit 79. Pallet P having a setup workpiece W mounted thereon is placed on pallet rest 69 of that other pallet stocker 59. Thus, after moving up lift 57 by hydraulic cylinder 55, moving rest 61 of this pallet stocker 59 is moved by pneumatic cylinder 63 in the Y-axis direction from the first stocker position far from stocker frame 73 to the second stocker position near to stocker frame 73. As a result, arm portion 77b of carrying arm 77 comes to be inserted under pallet P supported on pallet rest 69 through support pins 71. Next, by moving down lift 57 by hydraulic cylinder 55, pallet P supported on pallet rest 69 is transferred onto carrying arm 77. Moving rest 61 is then moved in the Y-axis direction by pneumatic cylinder 63 from the second pallet position to the first pallet position. This prevents carrying arm 77 from interfering with moving rest 61 or pallet rest 69 of pallet stocker 59, and enables carrying arm to be moved in the X-axis direction.

Next, carrying arm 77 is moved by drive unit 79 from pallet station 17 to the pallet change position in the machining area of machine tool main unit 13 and stopped at the position opposed to table 49. Next, saddle 15 is moved in the Y-axis direction from the first saddle position far from column 23 to the second saddle position near to column 23. As a result, table 49 comes to be arranged under arm portion 77b of carrying arm 77. Next, lifter 53 of table 49 is moved up to raise pallet P above from carrying arm 7, and saddle 15 is then moved in the Y-axis direction from the second saddle position to the first saddle position to move down lifter 53 again. By doing so, a new pallet P is transferred from carrying arm 77 to table 49 on saddle 15, and arranged in position on table 49 by engaging taper cones 51 of table 49 with taper holes of pallet P. Further, once saddle 15 is moved to the first saddle position, trunnion base 41 and table turning rest 45 on saddle 15 is prevented from interfering with conveyor arm 77. Therefore, carrying arm 77 is retreated in the X-axis direction along guide rails 75 from the machining area to pallet station 17 side and shutter 37 is then closed. Next, pallet P is clamped on table 49, and the workpiece W mounted on new pallet P is set in the desired position and then begins to be machined.

Figure 4:
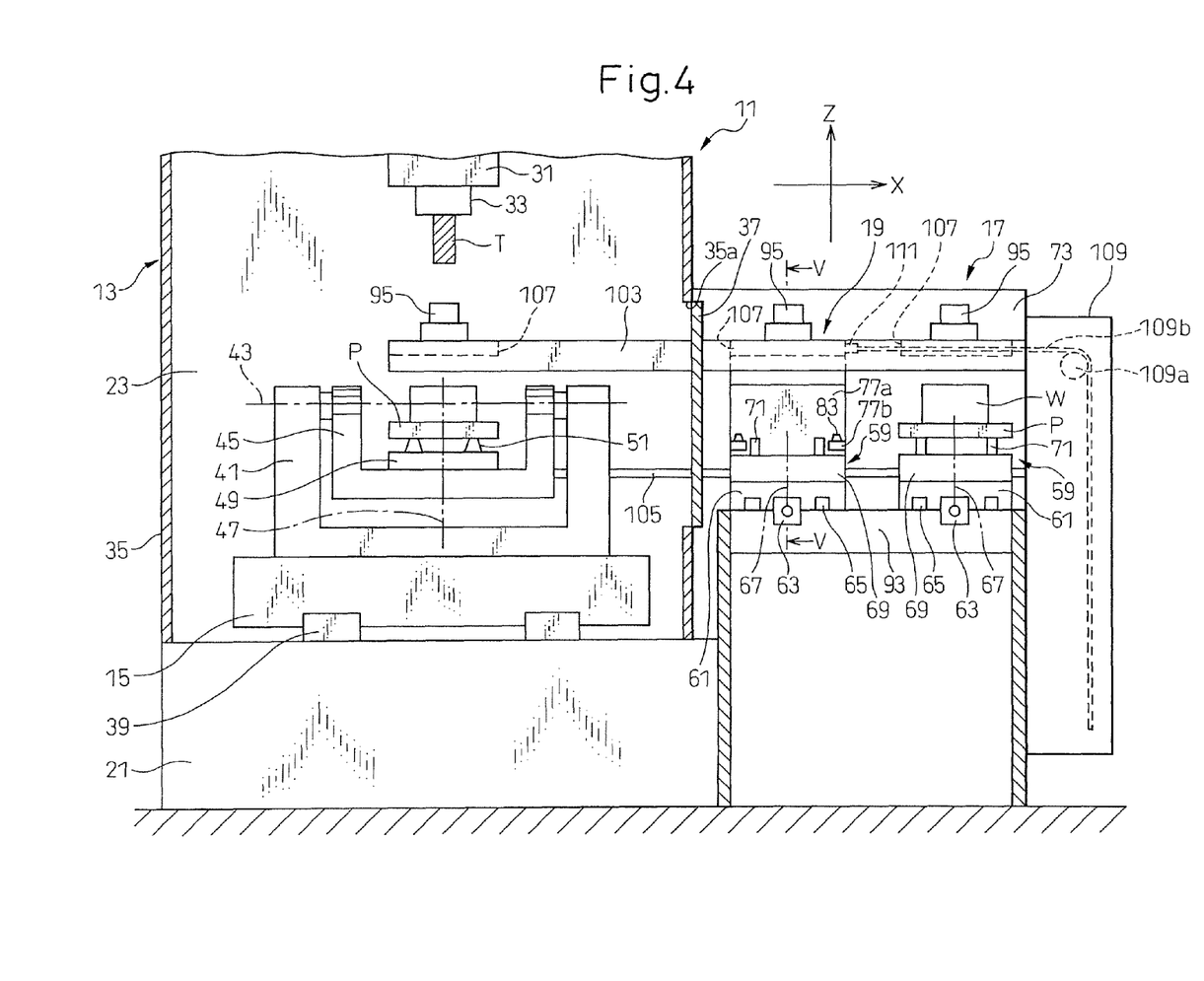
FIG. 4 is a diagram showing the general configuration of a machine tool according to a second embodiment of the present invention.
Figure 5:
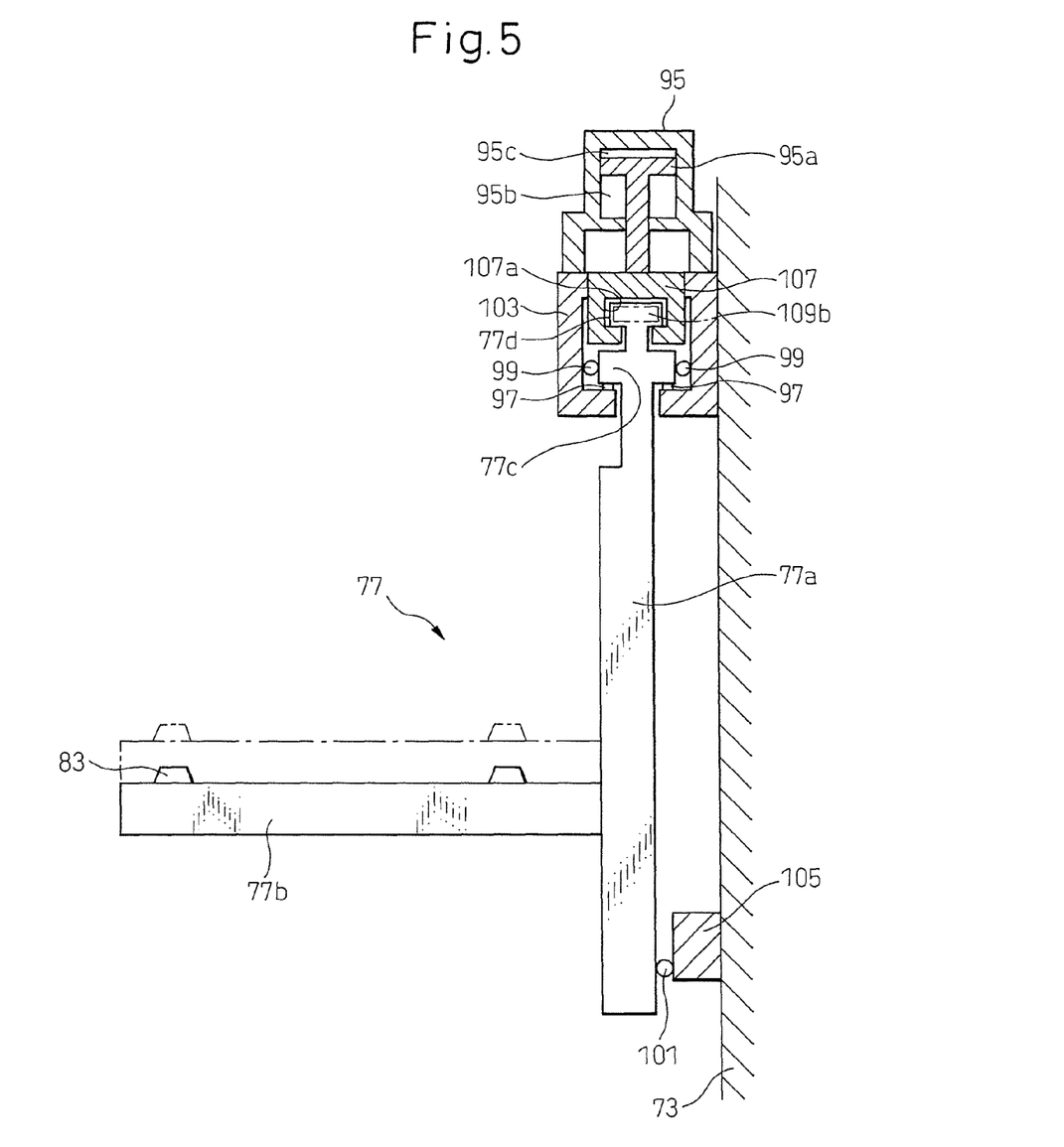
FIG. 5 is a sectional view taken along line V-V of FIG. 4.

Next, a machine tool according to a second embodiment of the present invention will be described below with reference to FIGS. 4 and 5. The difference from the first embodiment is that lifter 53 and hydraulic cylinder 55 are replaced by three cylinder units 95 for moving carrying arm 77 up and down. Specifically, a configuration is employed in pallet P is engaged with or disengaged from carrying arm 77 by moving carrying arm 77 up or down rather than by moving table 49 or pallet rest 69 up or down. Accordingly, lift 57 of pallet station 17 is also changed to a fixed base 93.

A thick portion 77c having a larger thickness is formed above body portion 77a of carrying arm 77, so that rollers 97 and slide pole supports 99 are mounted on the front and rear sides of thick portion 77c, respectively. A slide pole support 101 is also mounted on the lower rear side of body portion 77a. Further, a T-shaped portion 77d is formed above thick portion 77c. On the other hand, an upper rail 103 and a lower rail 105 are provided so as to extend in the X-axis direction from the column 23 to the stocker frame 73. Carrying arm 77 is supported so as to be slidable in the X-axis direction by the rolling action between upper rail 103 and rollers 97 and slide pole supports 99 as well as between lower rail 105 and slide pole support 101.

A mechanism for moving up and down carrying arm 77 at three pallet change positions, i.e., one pallet change position where pallet P is transferred in the X-axis direction between carrying arm 77 and table 49 and two pallet change positions where pallet P is transferred between carrying arm 77 and two pallet rests 69 of pallet station will be described. At each of the pallet change positions, a T-grooved block 107 having a T-shaped groove 107a into which a T-shaped portion 77d of carrying arm 77 loosely fits is provided in upper rail 103 so as to be slidable in the vertical direction. Above T-grooved block 107, cylinder unit 95 is mounted on upper rails 103, and the lower end of a piston 95a of cylinder unit 95 is fixed to T-grooved block 107. When a pressured fluid is introduced into a lower cylinder chamber 95b of cylinder unit 95, piston 95a moves up, so that T-grooved block 107 pulls up T-shaped portion 77d thereby to move up carrying arm 77. On the other hand, when the pressured fluid is introduced into an upper cylinder chamber 95c, carrying arm 77 moves down. Slide pole supports 99, 101 can slide in the Z-axis direction as well as in the X-axis direction, and roll while being in contact with the inner surface of upper rail 103 and the front surface of lower rail 105.

Next, a mechanism for moving carrying arm 77 in the X-axis direction will be described. A drive unit 109 for moving a long chain 109b in the longitudinal direction thereof by a sprocket wheel 109a is provided at the right end of stocker frame 73. In the part of the interior of upper rail 103 along the longitudinal direction where no T-grooved block 107 is provided, T-grooved bars (not shown) having the same cross section as T-grooved block 107 are fixed in alignment with T-grooved blocks 107 and to function as a groove in which chain 109b runs. Chain 109b can run in T-shaped groove 107a formed continuously over T-grooved bars and T-grooved blocks 107 in upper rail 103. The cross section of chain 109b has a rectangular shape, which loosely fits in the cross section of the T-shaped groove 107a so that chain 109b is prevented from loosening if it is pushed or pulled by sprocket wheel 109a. The left end of chain 109b is coupled to the right end of T-shaped portion 77d of carrying arm 77 through a joint member 111. Joint member 111, which transmits the motion of chain 109b in the X-axis direction to carrying arm 77, is formed in a shape not to hamper the vertical motion of carrying arm 77 at the pallet change positions. The other end of chain 109b moves up and down in accordance with the X-axis position of carrying arm 77.

Next, the procedure for changing a pallet by the pallet carrying device 19 of the machine tool shown in FIGS. 4 and 5 will be described.

Assume that during machining of a workpiece W, a pallet P that has already been setup is placed on right pallet stocker 59 and moving base 61 has been moved to the first stocker position far from stocker frame 73. When the machining of workpiece W has been completed, saddle 15 is moved to the first saddle position far from column 23, and shutter 37 is opened thereby to move carrying arm 77 to the pallet change position in the machining area. Saddle 15 is then moved to the second saddle position near to the column and arm portion 77b is inserted into the gap between pallet P and table 49 positioned under the pallet P. Carrying arm 77 is moved up by cylinder unit 95 thereby to lift pallet P. After moving saddle 15 to the first saddle position, carrying arm 77 is moved down by cylinder unit 95, and further moved by drive unit 109 to the pallet change position corresponding to left pallet stocker 59 on pallet station 17. Carrying arm 77 is moved up, and moving base 61 is moved to the second stocker position near stocker frame 73. Carrying arm 77 is then moved down so that pallet P is placed on pallet rest 69 through support pins 71. After moving base 61 having pallet P placed thereon is moved to the first stocker position, carrying arm 77 is moved to the pallet change position corresponding to right pallet stocker 59. Right moving base 61 is moved to the second stocker position, and arm portion 77b is inserted into the gap between pallet P and pallet rest 69 positioned under the pallet P. Carrying arm 77 is moved up, and moving base 61 is moved to the first stocker position. Further, carrying arm is moved down and moved in the X-axis direction to the pallet change position corresponding to table 49. After moving up carrying arm 77, saddle 15 is moved to the second saddle position, carrying arm 77 is moved down thereby to place pallet P on table 49, and pallet P is clamped on table 49. Saddle 15 is moved to the first saddle position, and carrying arm 77 is then moved to the pallet change position corresponding to right pallet stocker 59 on pallet station 17, followed by closing shutter 37. After that, a workpiece W mounted in a new pallet P begins to be machined.

In the second embodiment, upper rail 103 is provided at the position corresponding to carrying arm 77 when moved down. However, upper rail 103 may be provided at the position corresponding to carrying arm 77 when moved up.

As described above, in machine tool 11 according to the present invention, pallet P is transferred between table 49 of machine tool main unit 13 and pallet station 17 by pallet carrying device 19 arranged between table 49 and column 23. Therefore, a safe operation area for monitoring of machining and removal of chips can be secured while the front side of the machining area of machine tool main unit 13 is not occupied by pallet carrying device 19.

Although the present invention has been described above based on the illustrated embodiments, it is not limited to the illustrated embodiments. Further, although the present invention has been described above by exemplifying the vertical machining center having the trunnion table, it is applicable to a horizontal machining center, a milling machine, a combined processing machine, a boring machine, a grinding machine, an electric discharge machine and any other machine tool in which a pallet carrying device can be arranged between a table and a column. The table of the machine tool also may be of other types which have one or no turning axis, an angle plate mounted thereon, etc.

The invention claimed is:

1. A machine tool for machining a workpiece by moving a tool and the workpiece relative to each other, said machine tool comprising:
    a bed,
    a column erected on the bed,
    a headstock adapted to be movable horizontally in an X-axis direction,
    a vertical spindle head adapted to be movable vertically in a Z-axis direction on the headstock, and for rotatably supporting a spindle adapted to mount the tool on the top end thereof,
    a table adapted to be movable horizontally in a Y-axis direction on the bed and having a pallet mount on which a pallet for said workpiece to be mounted thereon is mounted;
    a pallet station provided on the side of the bed and having a pallet rest for a pallet to be placed thereon; and
    a pallet carrying device having arranged between said column and said table, a carrying arm for holding a pallet, said carrying arm being moved horizontally in the X-axis direction to carry said pallet between said table and said pallet station.

2. The machine tool according to claim 1, further comprising a first turning unit turning said table about a horizontal axis and a second turning unit turning said table about a vertical axis.

3. The machine tool according to claim 1 or 2, wherein said table has a lifter moving up and down said pallet.

4. The machine tool according to claim 1 or 2, wherein said pallet station has a pallet lifting device moving up and down said pallet.

5. The machine tool according to claim 1 or 2, wherein said pallet carrying device has a carrying arm lifting devices, said carrying arm lifting device moving up and down said carrying arm when said carrying arm is at a position where said pallet is transferred between said carrying arm and said table and at a position where said pallet is transferred between said carrying arm and said pallet station.

* * * * *